Aug. 8, 1939  E. HURST ET AL  2,168,775
METHOD OF MAKING WEB MATERIAL
Filed May 17, 1935    4 Sheets-Sheet 1
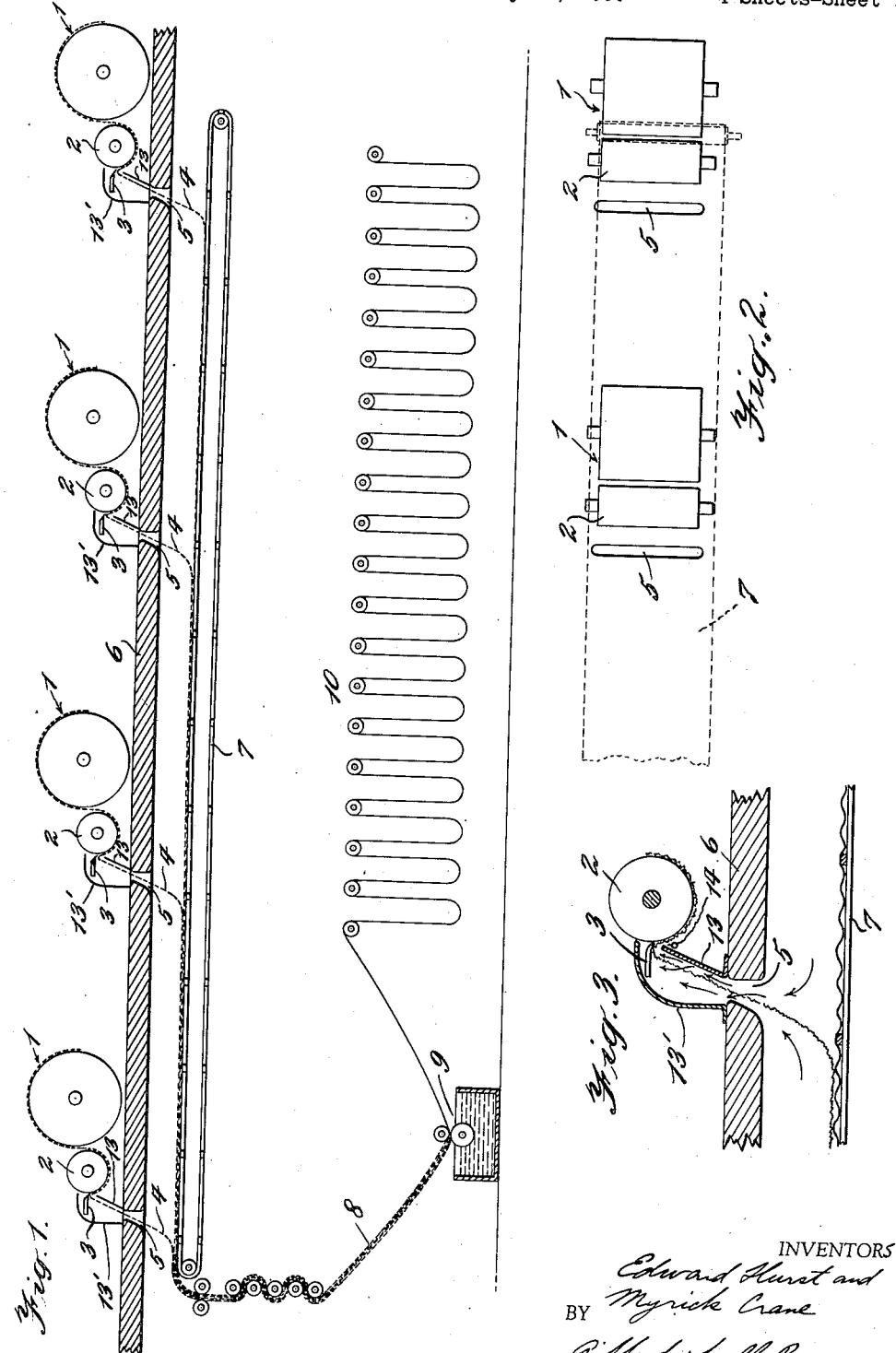
INVENTORS.
Edward Hurst and
BY Myrick Crane
Gifford, Scull & Burgess
ATTORNEYS.

Aug. 8, 1939. E. HURST ET AL 2,168,775
METHOD OF MAKING WEB MATERIAL
Filed May 17, 1935 4 Sheets-Sheet 2
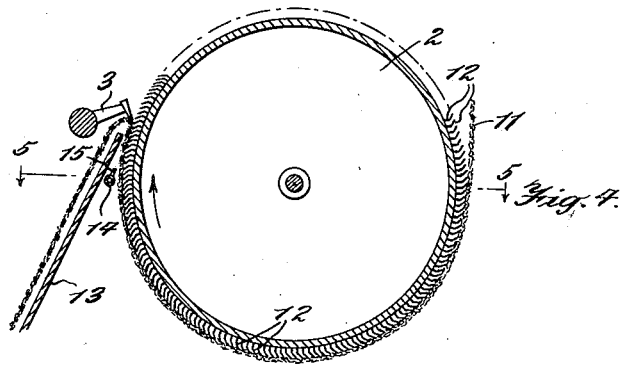
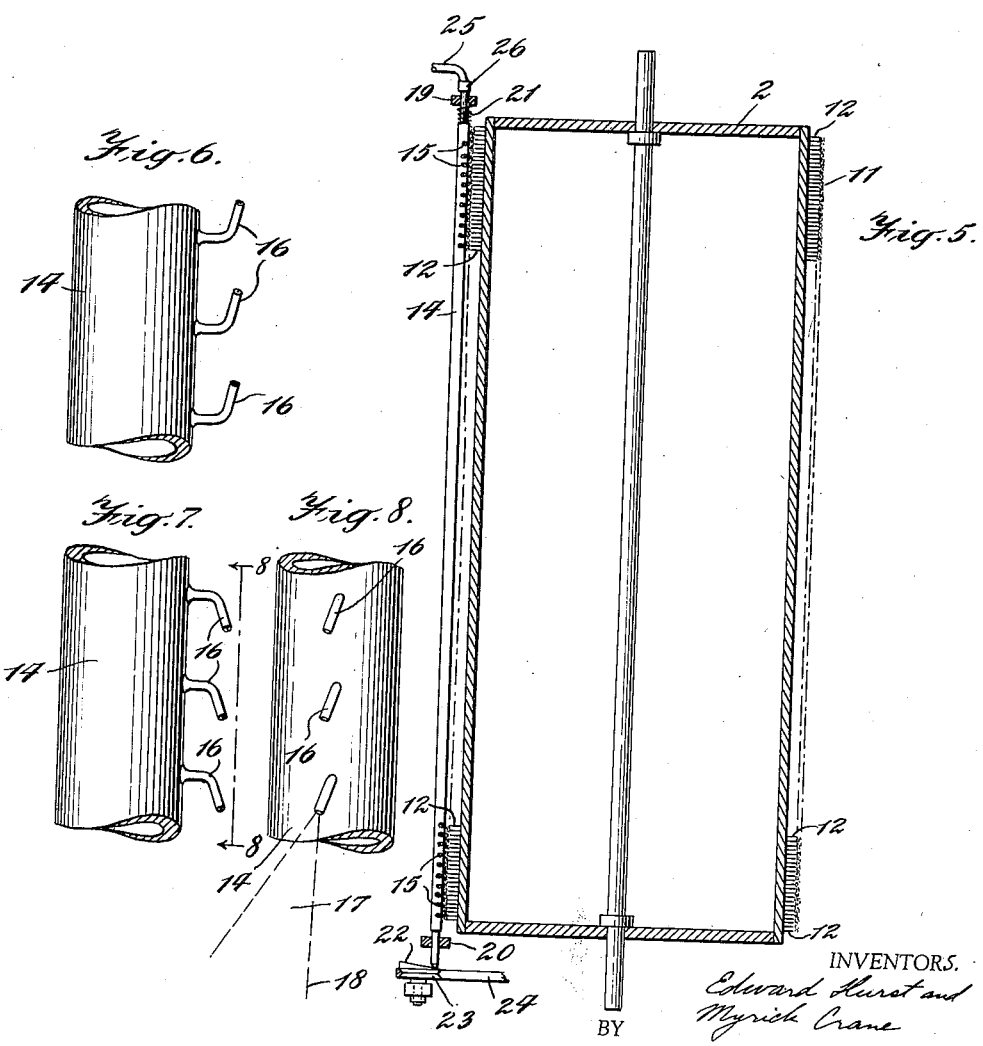

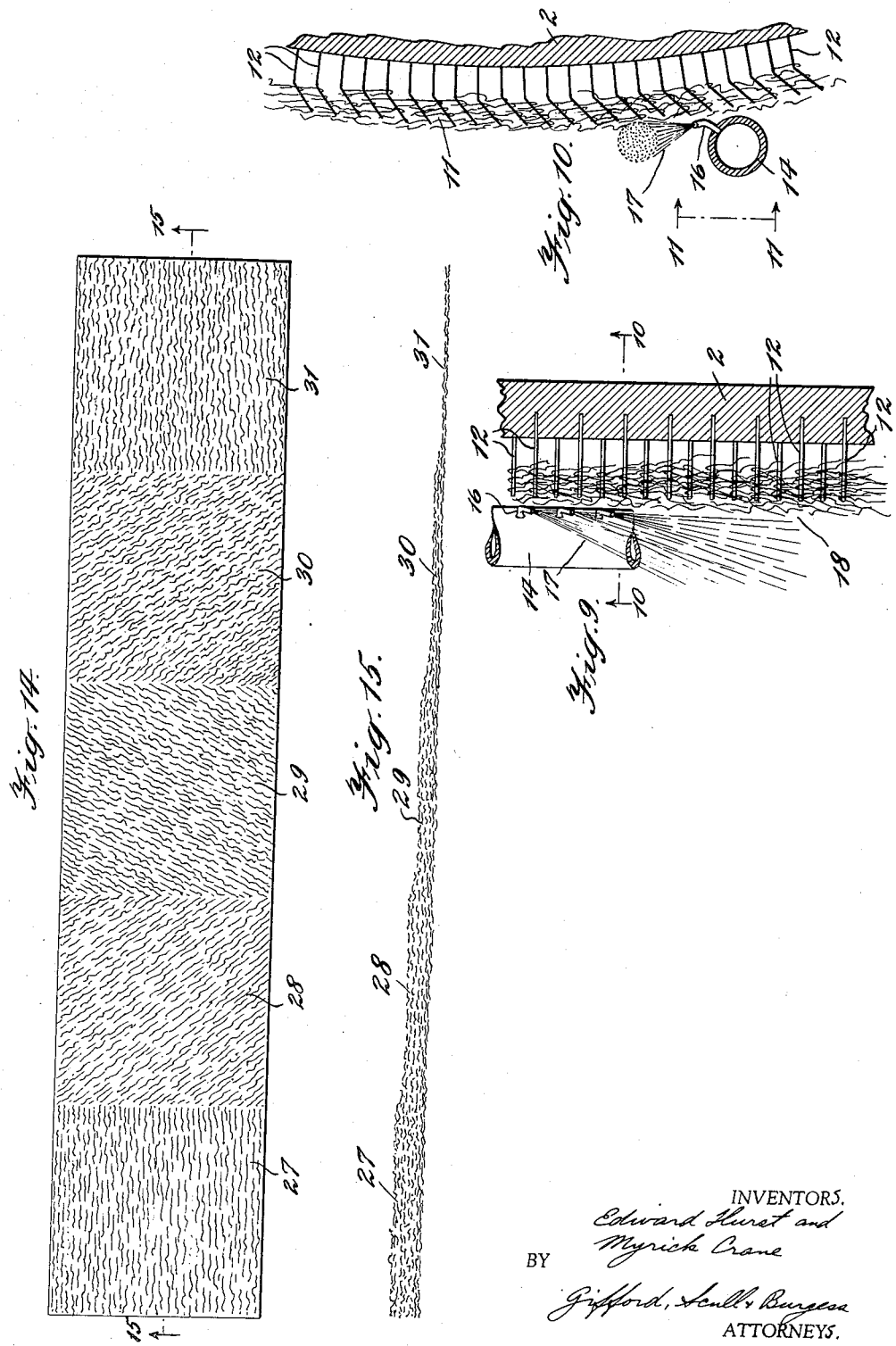

Aug. 8, 1939  E. HURST ET AL  2,168,775
METHOD OF MAKING WEB MATERIAL
Filed May 17, 1935   4 Sheets-Sheet 4

INVENTORS.
Edward Hurst and
Myrick Crane
BY
Gifford, Scull & Burgess
ATTORNEYS.

Patented Aug. 8, 1939

2,168,775

UNITED STATES PATENT OFFICE 2,168,775

METHOD OF MAKING WEB MATERIAL

Edward Hurst and Myrick Crane, Fall River, Mass., assignors to United Cotton Products Company, Fall River, Mass., a corporation of Massachusetts Application May 17, 1935, Serial No. 21,949

9 Claims. (Cl. 19—106)

This application relates to improvements upon the apparatus described and claimed in our copending application, Ser. No. 673,392, and divisional applications thereof. The novel features of the present application will be best understood from the following description and the annexed drawings, in which we have shown selected embodiments of the apparatus on which the novel and improved product may be produced by a novel method. In the drawings:

Fig. 1 is a vertical sectional diagrammatic view of an apparatus which may be used in the practice of the invention;

Fig. 2 is a plan view of a portion of the structure appearing in Fig. 1;

Fig. 3 is a fragmentary view of part of the structure shown in Fig. 1, but on a greatly enlarged scale;

Fig. 4 is a view of part of the structure appearing in Fig. 3, but showing that structure in less diagrammatic form and on a greatly enlarged scale;

Fig. 5 is a section approximately on the line 5—5 of Fig. 4, certain parts being omitted;

Fig. 6 is a view on a still larger scale and showing another form of air nozzle than the form shown in Figs. 4 and 5;

Fig. 7 is a view similar to Fig. 6 but showing the nozzles in different positions than in Fig. 6.

Fig. 8 is a view on the line 8—8 of Fig. 7;

Fig. 9 is a fragmentary view on the same plane as Fig. 5 but on a greatly enlarged scale and showing the form of nozzle appearing in Figs. 7 and 8;

Fig. 10 is a view approximately on the line 10—10 of Fig. 9;

Fig. 14 is a diagrammatic view illustrating a use which may be made of the invention in forming a web;

Fig. 15 is a section approximately on the line 15—15 of Fig. 14 and likewise diagrammatic in character.

Figure 11:
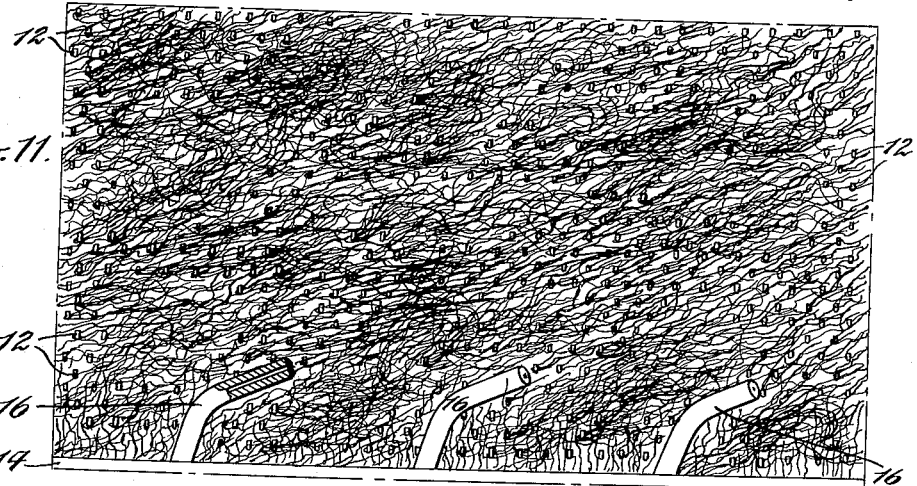
Fig. 11 is a view approximately on the line 11—11 of Fig. 10 but on a greatly enlarged scale.

The invention may be practiced by forming laps or membranes upon a plurality of cards 1 which may be of any suitable or usual form, as is well known in the textile arts. Cards are used for forming fibers into thin membranes, sometimes termed "laps", and in which the fibers are generally parallel with each other. Each card may comprise a doffer cylinder 2 from which the membrane or lap is removed by a comb 3, all as known in the art.

As disclosed in our aforesaid copending application, the membranes 4 are led through orifices 5 in the floor 6 upon which the cards are supported, and in passing through these orifices they are preferably subjected to the treatment more fully described and claimed in the copending application of Edward Hurst, Ser. No. 722,868. They are then received upon a moving and vibrating conveyor 7 and formed into a web 8 which is subjected to a bath at 9 and dried at 10, all in a manner more fully described and claimed in our aforesaid copending application.

The resulting web is one in which the fibers are interwoven in each membrane and also throughout the body of the web, the interengagement and interweaving of fibers in the web being so uniform that it is impossible to tell what fibers originally formed one membrane and what formed another. The fibers are gently acted on by currents of air so that they are rearranged in definite planes and in a multiplicity of those planes without the continuity of the membranes or webs being disturbed. The fibers do, however, extend generally lengthwise of the web, although mostly at acute angles to the longitudinal axis of the web.

According to the present invention, we have provided means for causing the fibers in any particular membrane to extend generally in a direction transversely to the longitudinal axis of the membrane or in any desired direction. Some of the advantages of this feature will be more fully pointed out later.

Referring now more particularly to Figs. 4 and 5, we have shown therein the membrane 11 on a doffer cylinder 2 provided with a multiplicity of teeth 12. These teeth may be of any of the usual forms of teeth used in such apparatus. The membrane is removed from the cylinder by the comb 3 and caused to pass through an orifice 5 which has associated therewith an apron 13 and a cover 13' to control the currents of air indicated in Fig. 3 and which cause an interweaving action, in a manner more fully described and claimed in said copending application, Ser. No. 722,868.

The teeth of the doffer cylinder engage the fibers of a membrane and hold them on the cylinder in a direction generally circumferential thereof. The appearance of the fibers is indicated best near the lower portions of Figs. 11, 12, and 13, where it will be seen that the fibers are generally parallel to each other and extend circumferentially of the cylinder, although, of course, because of their kinkiness it will not be exactly parallel.

Figure 12:
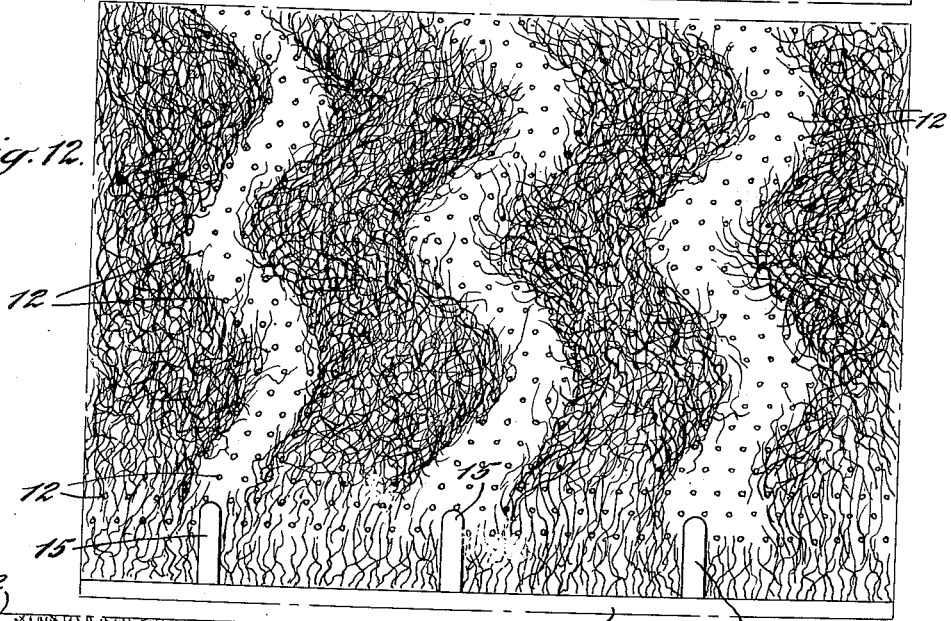
Fig. 12 is a view similar to Fig. 11 but showing the same type of nozzles as in Figs. 4 and 5 and also showing the effect achieved by reciprocation of those nozzles.
Figure 13:
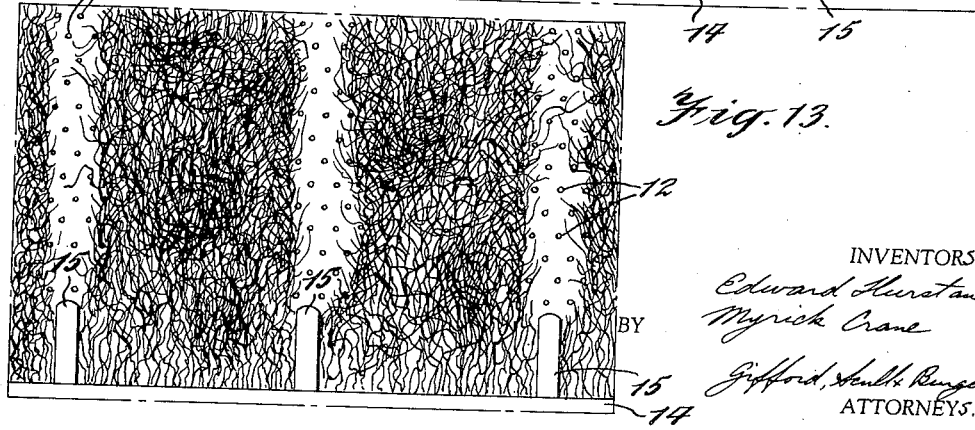
Fig. 13 is a view similar to Fig. 12 but showing the effect achieved when the nozzles are not reciprocated.

Adjacent the face of the doffer cylinder and a short distance below the comb and the upper edge of the apron 13, we dispose an air pipe 14 having a plurality of air nozzles 15 extending therefrom towards the cylinder. In the form shown in Figs. 4, 5, 12, and 13, these nozzles extend substantially normal to the pipe, and the air coming therefrom will substantially clear the fibers from certain of the teeth 12. If the nozzles are kept in fixed position, the result will be something as shown in Fig. 13, wherein it will be seen that each nozzle 15 has cleared away the fibers from the teeth in front of that nozzle as the cylinder rotates. The rotation of the cylinder is in the direction of the arrow in Fig. 4, which means that the surfaces appearing in Figs. 11, 12, and 13 are moving upwardly. If, on the other hand, the nozzles are caused to reciprocate parallel to the surface of the cylinder, as can be done by means to be described later, some such zigzag path as shown in Fig. 12 will be the result, such a path occurring in front of each nozzle.

After a membrane is thus subjected to the action of air jets from the nozzles, the membrane is removed by the comb as before, and subjected to what we have termed "aerodynamic weaving" in its passage through the orifice 5 and in later steps more fully described and claimed in said copending applications. The action of the comb and the weaving may or may not cause some narrowing or widening of the paths or gaps formed by the nozzles in the membrane, but in any case those paths will remain as a distinct feature of that membrane.

When a plurality of membranes treated in the manner described above are assembled and the fibers thereof interwoven as described and claimed in said copending applications, it will be readily seen that it is possible to get a wide variety of designs. The design of one membrane will be superimposed upon that of another, and the variety of patterns thus made possible is a wide one.

We consider it within the scope of our invention to place the nozzles at other places than that indicated, although we now consider that to be the best location. For example, we can place the nozzles so that they will act upon the web 8 before it reaches the bath 9 and thus disturb and displace the fibers in front of each nozzle to a sufficient extent to form definite weak zones extending lengthwise of the sheet for aiding in tearing. When the nozzles are thus placed to act upon the web, the arrangement may also be used to create desirable designs in the web.

As is well known in the textile arts, the teeth of the doffer cylinder hold the fibers thereon, and the action of the jets from the nozzles does not blow the fibers from the cylinder to any substantial extent. Rather, the fibers are displaced sidewise of the jets and the fibers on either side of the path left by a jet are denser and more closely spaced than in the membrane between those paths.

Referring now to Figs. 6 to 11, inclusive, we have shown therein a different form of nozzle. Each nozzle 16 is shown as bent so as to avoid directing a jet of air towards the cylinder. In Fig. 6, the nozzles are shown as being bent in one direction, whereas in the other figures they are shown as being bent in the opposite direction.

In Figs. 8, 9, and 10 is best shown the relation of the nozzles 16 to the material on the card. Each nozzle is bent lengthwise of the pipe 14 to which it is attached, and is likewise bent at an angle to the longitudinal axis of the pipe, as plainly shown in Fig. 8. The jet coming from the nozzle is in the form of a cone 17, which is indicated in Figs. 8, 9, and 10, and the positioning of the nozzle is such that one elemental surface 18 of the cone will be approximately parallel to the surface of the membrane 11 on the cylinder.

The result of this arrangement is to cause the vast majority of the fibers on the cylinder to extend in a direction approximately parallel to the direction of the air jet coming from a nozzle. The various jets will normally be parallel to each other, although that is not essential for all purposes. When they are parallel and when they are caused to act upon the fibers on a cylinder as that cylinder is rotated past the nozzles, the fibers will be changed from the circumferential positions shown at the bottom of Fig. 11 to the transverse positions indicated in the rest of that figure.

The pipe 14 may be given a reciprocating motion parallel to its axis, if desired. This motion may be used to achieve any wanted design, or may be used to make a more uniform distribution of the fibers, as shown in Fig. 11. The reciprocation may be achieved by the means illustrated in Fig. 5, wherein the pipe is shown as slidably mounted in spaced bearings 19 and 20 and urged by a spring 21 towards a cam 22 which may conveniently be mounted upon a pulley 23 operated by a belt 24. Air may be supplied to the pipe 14 by flexible connections, shown as a hose 25 connected to one end of the pipe by a suitable coupling 26.

The dimensions and arrangements of the various parts may be varied as found desirable. The membrane which is being acted upon is very delicate in character, as is known in the art, and therefore the parts must be carefully designed and adjusted. The volume and velocity of the air coming from the jets will vary with the thickness of the membrane, and that in turn will depend largely upon other factors known to cotton mill operators, cotton being the material preferably used.

For one use which has been made of the invention, we have found that minute nozzles having openings therein with diameters of the order of 0.01" or 0.02" are satisfactory. A jet of small volume and relatively high velocity has been found most satisfactory for our purposes at the present time.

In any use made of the invention herein, we intend so to regulate the volume and velocity of air and the arrangement of nozzles that the individual fibers will not be blown off the cylinder, although, of course, we appreciate the fact that a small percentage of fibers may be thus blown away. The vast majority of them, however, are held by some one or more teeth as they approach the nozzles, and they are not displaced from those teeth by the action of the air jets. As plainly shown in Fig. 11, which figure is drawn from an actual photograph, the fibers remain engaged with the teeth, but are blown in one direction therefrom.

In Figs. 14 and 15 we have shown quite diagrammatically one of the advantages which may follow from using a membrane which has been treated in the manner indicated in Fig. 11. Here we show a web formed of five laps or membranes 27, 28, 29, 30, and 31. In the outside membranes 27 and 31, the fibers have been subjected to the aerodynamic weaving action described in the aforesaid copending applications, but have not been subjected to the action described and claimed herein. In the intermediate membranes 28, 29, and 30, the fibers have been so treated, in the membranes 28 and 30 the fibers being displaced in one direction, and in the membrane 29 being displaced in the other direction. Then the five membranes have been brought together and interwoven, as described in said copending applications, with the result that a web is made which is of increased strength but which at the same time has all the advantages of homogeneity and other advantages which are achieved by the aerodynamic weaving.

On the other hand, there may be instances where, for example, it is desirable to form a web which will tear easily in a direction transversely of its length. In such case it is contemplated that the various membranes will have their fibers all disposed transversely to the length of the web and generally parallel to each other. For example, all membranes may have their fibers arranged, as indicated very diagrammatically, for the membranes 28 and 30 of Fig. 14, and then it will be seen that a web so constructed may be easily torn transversely of its length. Such an arrangement is of particular advantage where, for example, the web is to be used in making masking tape, which is one use to which our invention has been put.

One advantage of the arrangement shown is that the angle of the air jet may be varied as desired, so as to affect substantially all of the fibers on the cylinder or part only of those fibers, the percentage of fibers affected being determinable with fair accuracy by adjustment of the angle of the nozzles with respect to the surface of the membrane passing by the nozzles. For example, it is entirely feasible to cause the fibers on the surface of the membrane to take one direction while leaving undisturbed the fibers more remote from the nozzle and nearer the center of the cylinder. The proper angle and arrangement of nozzle with respect to the cylinder may be determined by experiment, and then the nozlzes may be bent to the desired position. It will also be obvious that, if desired, each nozzle may be made individually adjustable by other means, although for practical purposes, we find that bending of the nozzles forms a sufficient adjustment.

For the sake of convenience, I have referred to the sheet of fibers as it comes from the card as being a membrane, and the finished sheet as being a web. It is to be understood that these terms are used merely for the sake of convenience and not as limiting in any way as to size, either in superficial area or in thickness. Preferably, the material is cotton, since cotton fibers, because of their kinkiness, are peculiarly adapted for the interweaving and interlocking action referred to above. Similarly, while for convenience we have referred to the jets as being jets of air, nevertheless that term is not used in a limiting sense, as it will be readily understood that other gases may be used where found desirable. Under most circumstances, air is naturally the most convenient gaseous material to use. However, it is to be understood that the invention is not limited to any one material.

We claim:

1. In combination, a card comprising a rotating cylinder having a multiplicity of teeth thereon to engage fibers, a plurality of relatively widely spaced air nozzles disposed adjacent the face of said cylinder and each adapted to direct air towards said face, means to supply air to said nozzles in sufficient volume and at sufficient velocity to substantially clear the fibers from a relatively small number of said teeth in front of each nozzle, and means to move said nozzles back and forth generally parallel to the face of the cylinder.

2. In combination, a card comprising a rotating cylinder having a multiplicity of teeth thereon to engage fibers, a nozzle to discharge a jet of air of small volume but high velocity into contact with fibers engaged by a relatively small number of said teeth, and means causing said nozzle to move back and forth generally parallel to the face of the cylinder.

3. In combination, a card comprising a rotating cylinder having a multiplicity of teeth thereon to engage fibers, a plurality of air nozzles disposed adjacent the face of said cylinder and adapted to discharge air into contact with fibers on said teeth and along the face of the cylinder, means to supply air to said nozzles, and means to move said nozzles back and forth in a direction generally parallel to the face of the cylinder.

4. In combination, a card comprising a rotating cylinder having a multiplicity of teeth thereon to engage fibers, an air pipe extending generally parallel with the face of said cylinder, a plurality of air nozzles on said pipe and adapted to discharge air therefrom in contact with fibers on said teeth, and means to reciprocate said pipe longitudinally of its axis.

5. The method which comprises carding unspun fibers, to cause them to extend generally parallel to each other, then, while said fibers are on a surface of the card, directing a current of air against them in a direction generally along said surface but transverse to the lengths of the fibers, without substantially removing the fibers from the card, thereby causing many of said fibers to take positions on said surface transverse to their original positions, and then removing the fibers from the card.

6. The method which comprises carding unspun fibers, to cause them to extend generally parallel to each other, then, while said fibers are on a surface of the card, directing a current of air against them in a direction generally along said surface but transverse to the lengths of the fibers, without substantially removing the fibers from the card, thereby causing many of said fibers to take positions on said surface transverse to their original positions, then removing the fibers from the card in the form of a membrane, forming one or more other membranes of carded unspun fibers, displacing individual fibers in said other membranes to cause them to interlock with each other without substantially disturbing the continuity of the membranes, bringing surfaces of said membranes into contact with each other, and subjecting the fibers of all of said membranes to gentle currents of air to cause the fibers of one membrane to interlock with those of the other to form a web substantially as described.

7. The method which comprises carding unspun fibers, to cause them to extend generally parallel to each other, then, while said fibers are on a surface of the card, directing a current of air against them in a direction generally along said surface but transverse to the lengths of the fibers, without substantially removing the fibers from the card, thereby causing many of said fibers to take positions on said surface transverse to their original positions, then removing the fibers from the card in the form of a membrane, forming another membrane in a like manner but with the fibers therein extending generally in a direction different from the direction generally given to the fibers in the first-named membrane, bringing surfaces of said membranes into contact with each other, and subjecting the fibers of all of said membranes to gentle currents of air to cause the fibers of one membrane to interlock with those of the other to form a web substantially as described.

8. The method which comprises carding unspun fibers, to cause them to extend generally parallel to each other, then, while said fibers are on a surface of the card, directing a stream of air of small volume but high velocity against said fibers in a direction generally along said surface but transverse to the lengths of the fibers, without substantially removing the fibers from the card, thereby causing many of said fibers to take positions on said surface transverse to their original positions, and then removing the fibers from the card.

9. In a card comprising a rotating doffer cylinder having a multiplicity of teeth on the surface thereof to engage fibers and means to remove said fibers from said surface in the form of a membrane, a plurality of nozzles each having a minute opening therein, said nozzles being spaced apart lengthwise of said cylinder and being arranged to discharge air from said openings against the fibers on said surface shortly before they are removed therefrom, and means for reciprocating said nozzles lengthwise of the cylinder.

EDWARD HURST.
MYRICK CRANE.